_United States Patent_ [19]

Becker

[11] Patent Number: 5,991,538

[45] Date of Patent: Nov. 23, 1999

[54] SYSTEM FOR GENERATING AND USING PROGRAMS IN AN OBJECT-ORIENTED ENVIRONMENT WITH A MESSAGE DISPATCH ARCHITECTURE

[75] Inventor: Peter J. Becker, Capitola, Calif.

[73] Assignee: Inprise Corporation, Scotts Valley, Calif.

[21] Appl. No.: 07/993,145

[22] Filed: Dec. 18, 1992

[51] Int. Cl.[6] ........................................... G06F 9/45
[52] U.S. Cl. ................................................. 395/705
[58] Field of Search .................................. 395/650, 700, 395/705

[56] References Cited

U.S. PATENT DOCUMENTS 4,821,220  4/1989  Duisberg .................................. 364/578
5,212,792  5/1993  Gerety et al. ........................... 395/650

OTHER PUBLICATIONS

"Lisp" 3rd Edition by Winston et al, 1989, pp. 183–205.
"Artificial Intelligence and the Design of Expert Systems" by Luger et al, 1989, pp. 514–525.
"Programming Windows" by The Microsoft Press, 1988, pp. 16–23, and 169–171.
_Turbo C++ for Windows Version 3.0—Programmer's Guide_, 1991, Borland International, Inc., Scotts Valley, CA, pp. 145–152.

_ObjectWindows for C++–User's Guide_, 1991, Borland International, Inc., Scotts Valley, CA, pp. 7–13.

Shaw, R., _Programming Windows with a Touch of Class: The Microsoft Foundation Classes_, Microsoft Systems Journal, pp. 19–38, Nov. 1992.

Shaw, R., _The Virtual Column: Manage Messages the Easy Way_, Windows Tech Journal, pp. 18–21, Mar. 1992.

_Primary Examiner_—Tariq R. Hafiz
_Assistant Examiner_—Peter J. Corcoran, III
_Attorney, Agent, or Firm_—John A. Smart

[57] ABSTRACT

An object-oriented development system of the present invention includes a development system, which may include, among other features, a compiler, a linker, standard libraries, class libraries, and a debugger. Methods of the present invention include constructing C++ classes having response functions—C++ class methods which process specific system messages of interest. More particularly, a C++ class includes a registry object—an object which associates the message of interest with a particular response function. The registry object includes C++ template definition, whereby the object includes a "generic" function, that is, one which is not tied to any specific parameter type. In this manner, the message-response functions of the development system do not require compiler-specific extensions or unsafe casting operations.

23 Claims, 8 Drawing Sheets

SYSTEM FOR GENERATING AND USING PROGRAMS IN AN OBJECT-ORIENTED ENVIRONMENT WITH A MESSAGE DISPATCH ARCHITECTURE

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to the field of computer systems and, more particularly, to systems and methods for compiling source programs, particularly object-oriented ones, into system and application programs.

Before a digital computer may accomplish a desired task, it must receive an appropriate set of instructions. Executed by the computer's microprocessor, these instructions, collectively referred to as a "computer program," direct the operation of the computer. Expectedly, the computer must understand the instructions which it receives before it may undertake the specified activity.

Owing to their digital nature, computers essentially only understand "machine code," i.e., the low-level, minute instructions for performing specific tasks—the sequence of ones and zeros that are interpreted as specific instructions by the computer's microprocessor. Since machine language or machine code is the only language computers actually understand, all other programming languages represent ways of structuring human language so that humans can get computers to perform specific tasks.

While it is possible for humans to compose meaningful programs in machine code, practically all software development today employs one or more of the available programming languages. The most widely used programming languages are the "high-level" languages, such as C or Pascal. These languages allow data structures and algorithms to be expressed in a style of writing which is easily read and understood by fellow programmers.

A program called a "compiler" translates these instructions into the requisite machine language. In the context of this translation, the program which is written in the high-level language is called the "source code" or source program. The low-level or machine language, on the other hand, comprises "object code." Once created, object code (e.g., .obj file) is a separate program in its own right—it includes instructions which may be executed by the target microprocessor. In practice, however, the object code is usually first linked (i.e., combined) with other object code or libraries, which include standard routines.

Compilers are fundamental to modern computing. Translating human-oriented programming languages into computer-oriented machine languages, compilers allow computer programmers to ignore the machine-dependent details of machine language. Instead of focusing on the register set or memory architecture of a particular computer, for instance, one may simply concentrate on solving the problem at hand. Thus, high-level languages are "portable," that is, they afford a level of abstract which permits a single program to be implemented on several different machines, including ones of vastly different architecture.

Of particular interest to the present invention are compiler and development tools designed for graphic user interfaces (GUIs), such as Microsoft® Windows and Apple® Macintosh System 7. Employing an intuitive "desktop metaphor", including such familiar objects as file cabinets, folders, and trash cans, these system have largely displaced awkward command-line systems, such as MS-DOS.

While GUIs are easy for the users to use, they are by no means simple to program. Instead, the intuitive user interface belies an extremely complex system, one having hundreds of API (Application Programming Interface) calls. A simple "Hello World" Microsoft Windows program written in C, for example, requires a hundred or so lines of source code. Besides the sheer bulk of the API, however, the programmer faces an even greater challenge—that of understanding the intricacies of a message-driven environment.

At the heart of a GUI such as MS-Windows is a message or event-driven system, one which requires a shift in the way programmers normally think about computer programs. Traditionally, programmers have developed programs consisting of sequential procedures or modes. As such these programs have a well-defined beginning, middle, and end, with little or no flexibility for the user to vary this predetermined sequence.

A GUI, in contrast, promotes a "modeless" model, that is, one not tied to any particular predefined sequence of modes. To accomplish this, these systems introduce the notion of "events" and "messages." An event is any activity of interest, such as the press of key on a keyboard or movement of a pointing (mouse) device. The system responds to an event by sending a message to the currently executing application(s). In MS-Windows, for instance, when the user clicks a left mouse button, a $WM_{13}$ LBUTTONDOWN message is sent. Similarly, pressing a keyboard key causes a $WM_{13}$ KEYDOWN message to be sent. If the user selects an item from a menu, a $WM_{13}$ COMMAND message is sent. Other messages correspond to manipulating scroll bars ($WM_{13}$ HSCROLL, WMVSCROLL), resizing windows ($WM_{13}$ SIZE), redrawing windows ($WM_{13}$ PAINT), closing windows ($WM_{13}$ CLOSE), and so on.

There are so many messages which may be generated in fact that managing them has become quite a chore in itself. Using C, for example, the programmer writes an event loop that checks to see whether there any messages which must be responded to. In practice, however, this entails writing a gargantuan case statement that dispatches messages to various functions. And in a Windows program of any complexity, this case statement often spans several pages, making development and maintenance of the program an exceedingly difficult task.

While there is much interest in devising tools which reduce or eliminate the complexity of GUI development, efforts to date have been largely unsuccessful. Instead, programmers have had to rely on existing tools and methodology, ones developed for procedurally-driven architectures (e.g., the aforementioned C case statement). Present day tools are, however, largely inadequate for developing application programs for an event-driven architecture. What is needed are methods and systems for simplifying the message processing of an event-driven architecture. Just as high-level languages permit the programmer to focus on the problem at hand and not on the implementation of its solution, systems and methods are needed for relieving the programmer of the burden of message processing. The present invention fulfills this and other needs.

SUMMARY OF THE INVENTION

The present invention recognizes a need for providing an object-oriented development environment with improved message dispatching capability. A system of the present invention includes a development environment having a compiler, a linker, and an interface. Through an interface (either command-line or GUI driven), an application or system developer supplies source listings to the compiler. Additional source and/or programs are provided by class libraries. From the source listings (including header and include files), the compiler generates object module(s); these may be linked with other object modules or libraries to generate program executable by a target processor.

In a preferred method of the present invention for message dispatching, at least one message-handling C++ class is defined, the class including at least one method for responding to a message, and further including a registry object—an object which knows how to respond to a particular event message (by calling an appropriate response method). Preferably, the class is defined within the compiler-supplied class libraries. A template is also created for the registry object, with the registry object receiving parameters of a message (msg) and an address of associated function (pointer-to-member function). More particularly, the template provides a generic set of add methods for registering message/response function pairs while, at the same time, retaining class and parameter information. During operation of the event loop of the system, a particular message of interest (e.g., $WM_{13}$ MOVE) is dispatched in accordance with the template definition, whereupon the message invokes the proper response function.

DETAILED DESCRIPTION OF A PREFERRED EMBODIMENT

General Architecture

A. System Hardware

Figure 1A:
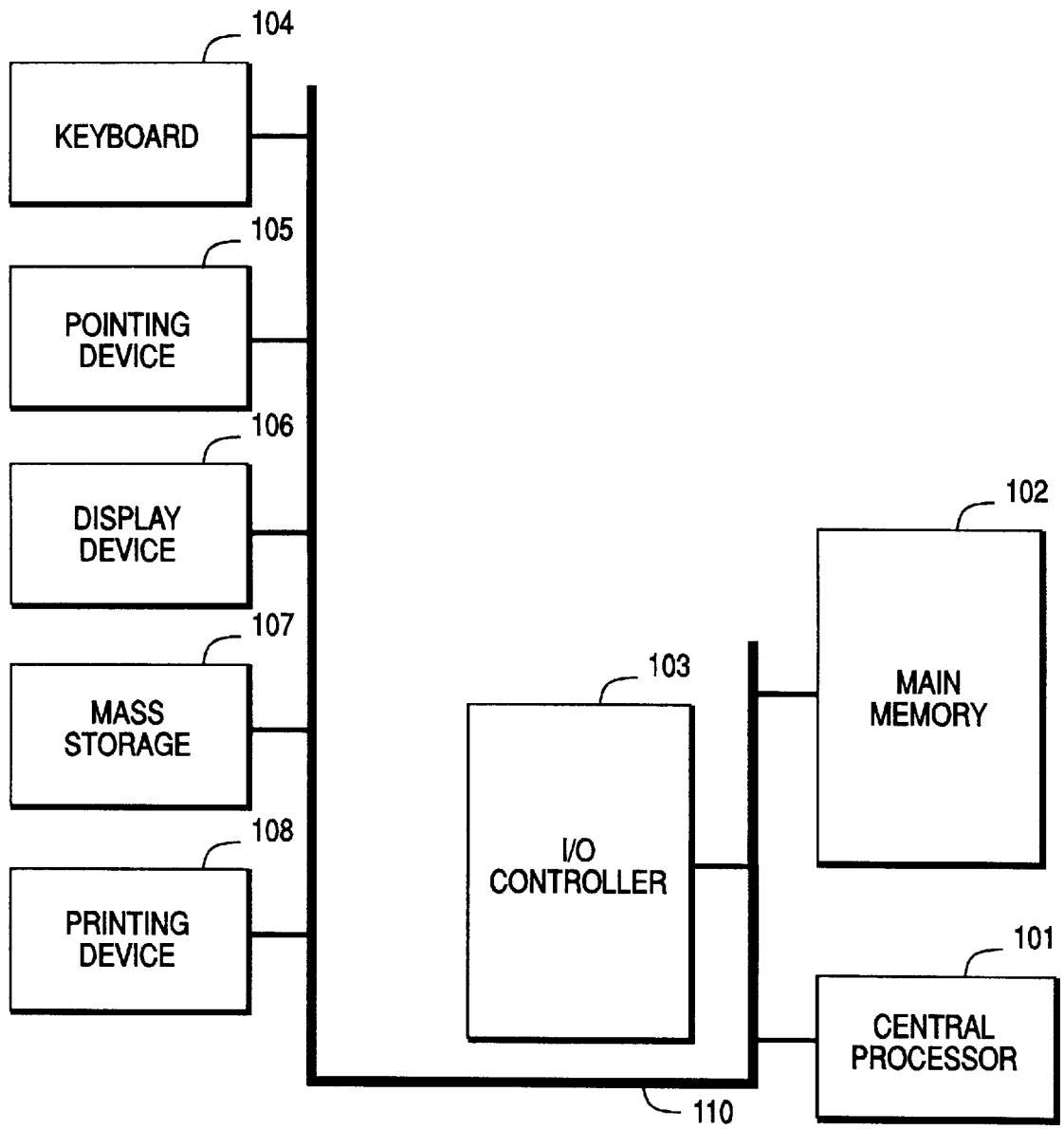
FIG. 1A is a block diagram of a computer system in which the present invention may be embodied.

The present invention may be embodied on a computer system such as the system 100 of FIG. 1A, which includes a central processor 101, a main memory 102, an input/output controller 103, a keyboard 104, a pointing device 105 (e.g., mouse, track ball, pen device, or the like), a display device 106, and a mass storage 107 (e.g., hard disk). Additional input/output devices, such as a printing device 108, may be provided with the system 100 as desired. As shown, the various components of the system 100 communicate through a system bus 110 or similar architecture.

B. System Software

The following description will focus on the presently preferred embodiments of the present invention, which are operative in an event-driven system, particularly Microsoft Windows environment. The present invention, however, is not limited to any particular application or any particular environment. Instead, those skilled in the art will find that the system and methods of the present invention may be advantageously applied to a variety of platforms and environments, whether command-line or GUI based, including MS-DOS, Macintosh, UNIX, NextStep, and the like. Therefore, the description of the exemplary embodiments which follows is for purposes of illustration and not limitation.

Figure 1B:
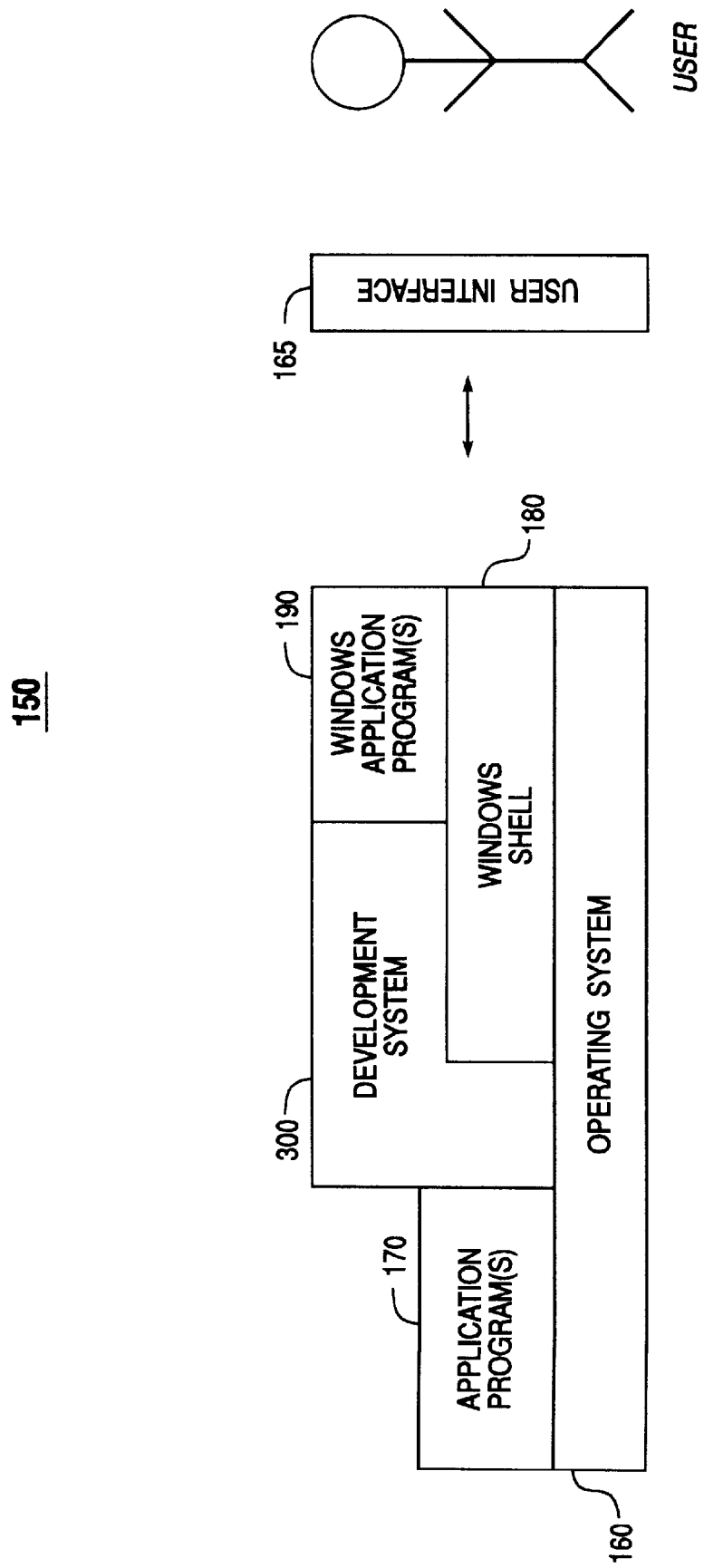
FIG. 1B is a block diagram of a software system for controlling the operation of the system of FIG. 1A, the software system including an object-oriented development system of the present invention.

Illustrated in FIG. 1B, a computer software system 150 is provided for programming the operation of the computer system 100. Software system 150, which is stored in system memory 102 and on disk memory 107, includes a kernel or operating system 160 and a windows shell or interface 180. One or more application programs, such as application programs 170 or windows applications programs 190, may be "loaded" (i.e., transferred from storage 107 into memory 102) for execution by the system 100. OS 160 and shell 180, as well as application software 170, 190, communicate with the user through an interface 165 for receiving commands and data and displaying results and other useful information.

Software system 150 also includes a development system 200 of the present invention for developing system and application programs. As shown, the development system 200 includes components which interface with the system 100 through windows shell 180, as well as components which interface directly through OS 160.

In a preferred embodiment, the system 100 is an IBM-compatible personal computer, available from a variety of vendors (including IBM of Armonk, N.Y.). Operating system 160 is MS-DOS and shell 180 is Microsoft Windows, both of which are available from Microsoft Corporation of Redmond, Wash.; alternatively, the system 100 may be implemented in other platforms, including Macintosh, UNIX, and the like. Development system 200 includes Borland C++ , version 3.1, available from Borland International of Scotts Valley, Calif. Application software 170, 190, on the other hand, can be any one of a variety of software applications, including word processing, database, spreadsheet, text editors, and the like.

Event-driven Windows Development

A. Windows interface

Figure 2A:
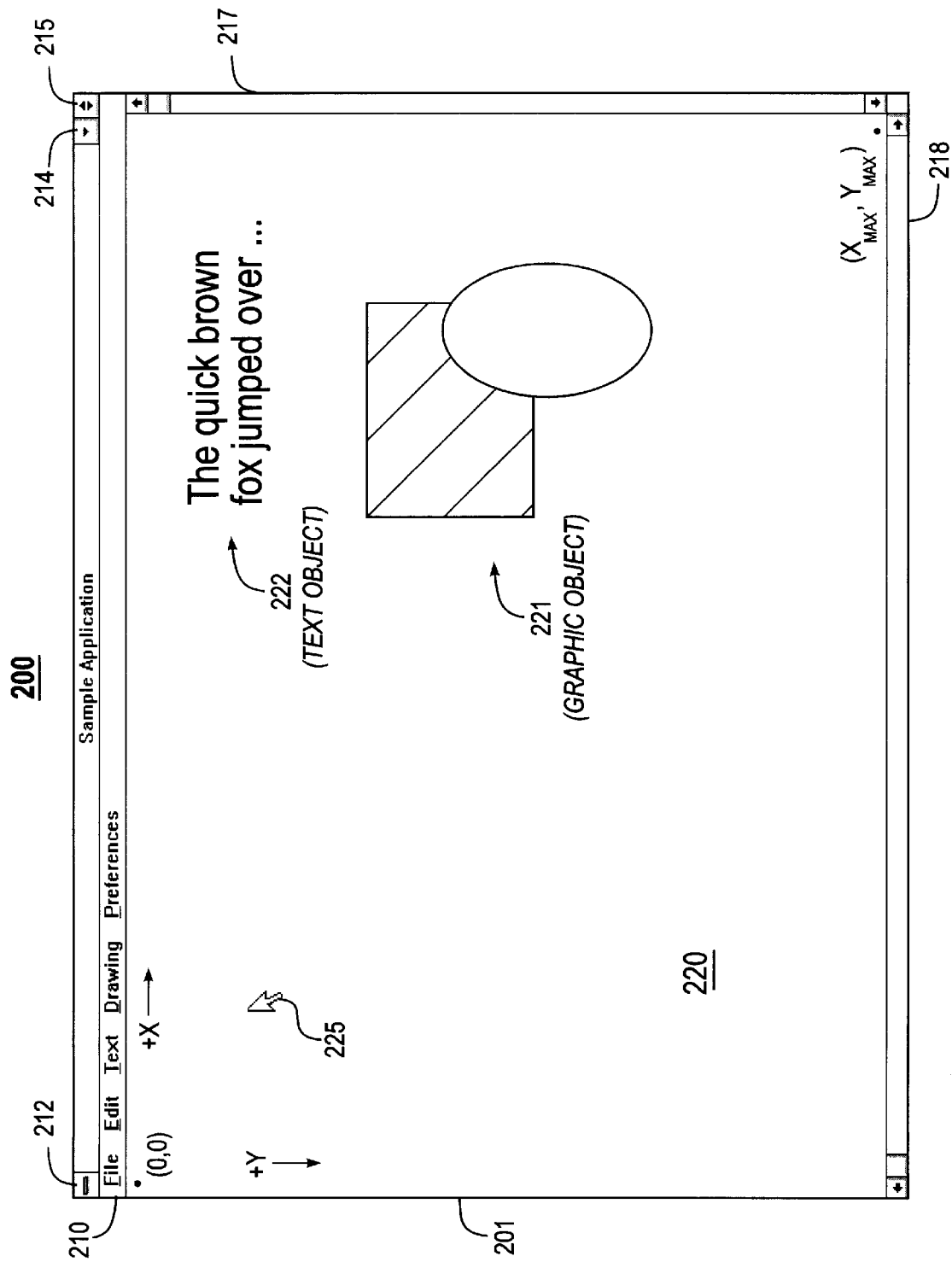
FIG. 2A is a screenshot bitmap of an event-driven graphic user interface employed the present invention.

As shown in FIG. 2A, the system 100 typically presents UI 165 as a windowing interface or workspace 200. Windows interface 200 is a rectangular, graphical user interface (GUI) providing one or more windows 201 for display on screen 106; additional window objects may be displayed in various sizes and formats (e.g., tiled or cascaded), as desired. At the top of window 201 is a menu bar 210 with a plurality of user-command choices, each of which may invoke additional submenus and software tools for use with application objects. Window 201 also includes a client area 220 for displaying and manipulating screen objects, such as graphic object 221 and text object 222. In essence, the client area is a workspace or viewport for the user to interact with data objects which reside in the memory 102 of the computer system 100.

Windows interface 200 includes a screen cursor or pointer 225 for selecting and otherwise invoking screen objects of interest. In response to user movement signals from the pointing device 105, the cursor 225 floats (i.e., freely moves) across the screen 106 to a desired screen location. During or after cursor movement, the user may generate user-event signals (e.g., mouse button "clicks" and "drags") for selecting and manipulating objects, as is known in the art. For example, Window 201 may be closed, resized, or scrolled by "clicking on" (selecting) screen components 212, 214/5, and 217/8, respectively. Keystroke equivalents, including keyboard accelerators or "hot keys", are provided for performing these and other user operations through keyboard 104.

B. Event-driven Architecture and "Messages"

Underlying the windows interface is a message or event-driven architecture. This model is perhaps best described by contrasting its operation with that of a modal or sequential architecture which has been traditionally employed. In this manner, the reader may appreciate the added flexibility as well as complexity of an event-driven system.

Figure 2B:
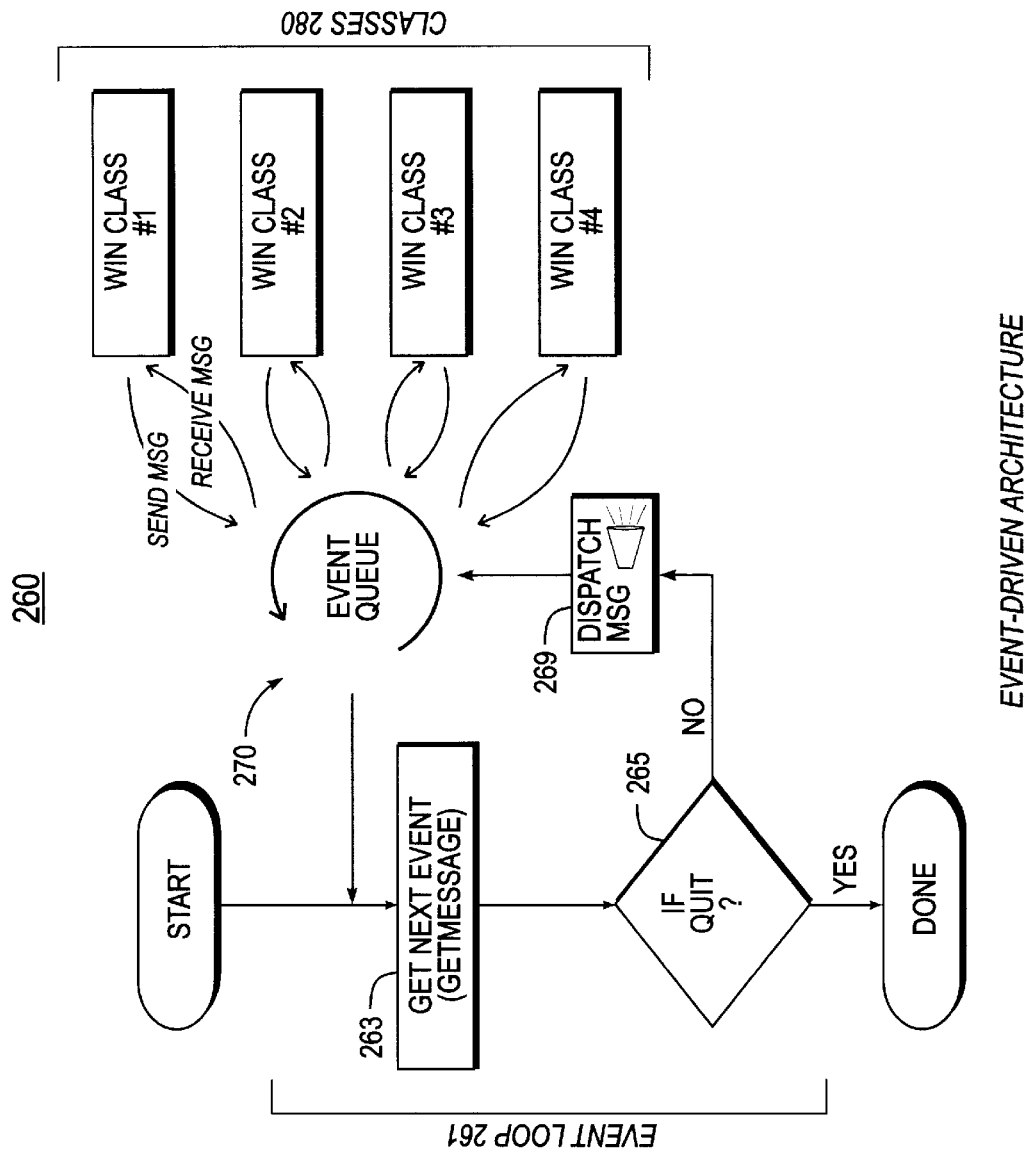
FIG. 2B is a block diagram comparing an event-driven model with traditional modal architecture.
Figure 2B:
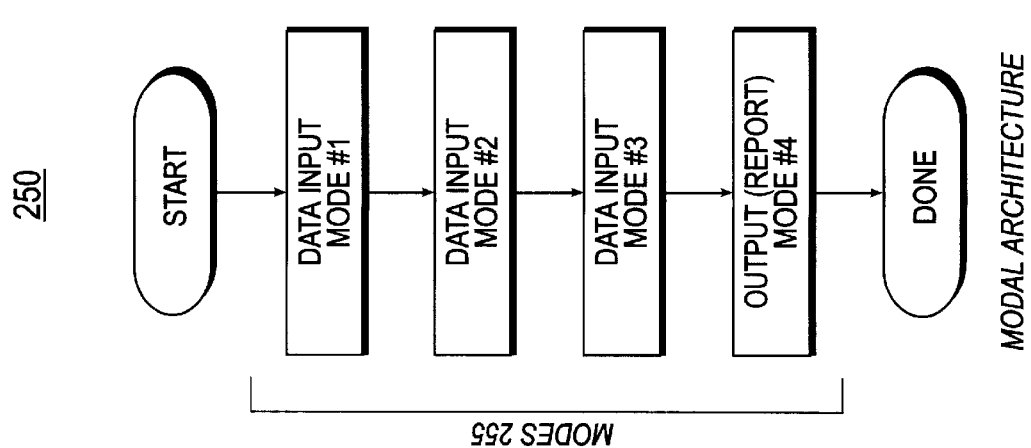

As shown in FIG. 2B, a modal program 250 comprises a series of discrete operating blocks or modes 255, with a well-defined beginning, middle and end. In actual operation, such a program typically displays a series of input screens for receiving user information, for example, to create a written report. For instance, the first entry screen may require a customer name, the second a customer address, the third a part number, and so on. The program typically terminates in an output mode, for reporting results determined from the various inputs. Thus, the program 250 follows a fairly rigid sequence of operation, with each input or entry mode demanding successful completion before the program proceeds to the next step.

While a modal program is relatively easy to design and implement, it is not so easy to use. The design certainly ensures that all required information is entered, but only at the expense of forcing users to operate in a manner dictated by the program. Specifically, since the program is built around a pre-arranged set of modes, a user cannot get from one mode to another without first completing a previously-required mode. In the present example, for instance, a user must needlessly complete a customer name entry screen (and any other intervening input screens) just to access part number information. Any deviation from this sequence by the user is simply not permitted. Lacking flexibility, modal programs make a poor choice for handling real-world tasks.

As shown in the second half of FIG. 2B, an event-driven architecture 260 eschews a pre-selected sequence, opting instead for an "event loop." The event loop 261 is a centralized mechanism for processing messages about user and system events. It includes an event queue 270 and mechanisms for retrieving 263 and dispatching 269 messages to various window classes 280. Before each of these components is further described, it is helpful to understand the notion of "messages."

In a typical modal environment, especially those typified by a character-based UI, a program reads from the keyboard by making an explicit call to a function, such as the C function getcharo. The function typically waits until the user presses a key before returning the character code to the program; all system activity ceases until completion of this one step. In a Windows environment, in contrast, the operating system uses messages to manage and synchronize multiple applications and hardware events, such as clicks of a mouse or presses of a keyboard, which in MS-Windows are converted to messages by Windows event handlers.

From a programming perspective, a message is simply a data structure containing information about a particular event. In MS-Windows, a message structure includes a message identifier, a 16-bit unsigned integer which serves as a symbolic constant for a particular event. For example, messages from a window object might include information about creating ($WM_{13}$ CREATE), closing ($WM_{13}$ CLOSE), moving ($WM_{13}$ MOVE), and re-sizing ($WM_{13}$ SIZE) the window. Additional event data are available as message parameters (e.g., Windows wparam and 1Param); the exact interpretation of a given parameter varies with each event type represented. Input messages are collected in a system-wide queue and then directed to the proper window. These messages, along with timer and screen paint (screen redraw) messages, must be passed to the target application(s) of interest.

A mechanism is provided for retrieving messages from the system queue and dispatching them to the appropriate application which, in turn, may proceed to process any message that arrives. Each window belongs to a particular window type which defines certain characteristics common to all windows of that type. Associated with each type is a Windows function which processes all messages sent to windows of its type. An application queue is provided where Windows may place messages that belong to a specific application. When the application is ready to receive input, it simply reads the awaiting messages. If none are found or if there exists a message for other applications with higher priority, Windows passes control to the other applications.

To process these events, therefore, a message or event loop 261 may be simply constructed as:

```
while (GetMessage (&msg, NULL, 0, 0))
{
TranslateMessage (&msg) ;
DispatchMessage (&msg) ;
}
return msg.wParam ;
}
``` where a message (&msg) is retrieved by a call to GetMessage (step 263); if needed, the retrieved message may be translated by a call to TranslateMessage and then dispatched by a call to DispatchMessage (step 269). This "while" loop continues until the GetMessage function returns a value of zero—indicating that the loop has read a $WM_{13}$ QUIT message from the queue, telling the application to end (yes at step 265).

The general mechanism for retrieving and dispatching messages in an event-based system, such as Microsoft Windows, is known in the art; see, e.g., Petzold, C., Programming Windows, Second Edition, Microsoft Press, 1990. Additional information can be found in Microsoft's Window Software Development Kit, including: 1) Guide to Programming, 2) Reference, Vols. 1 and 2, and 3) Tools, all available from Microsoft Corp. of Redmond, Wash. The disclosures of each of the foregoing are hereby incorporated by reference.

C. Development System

Figure 3A:
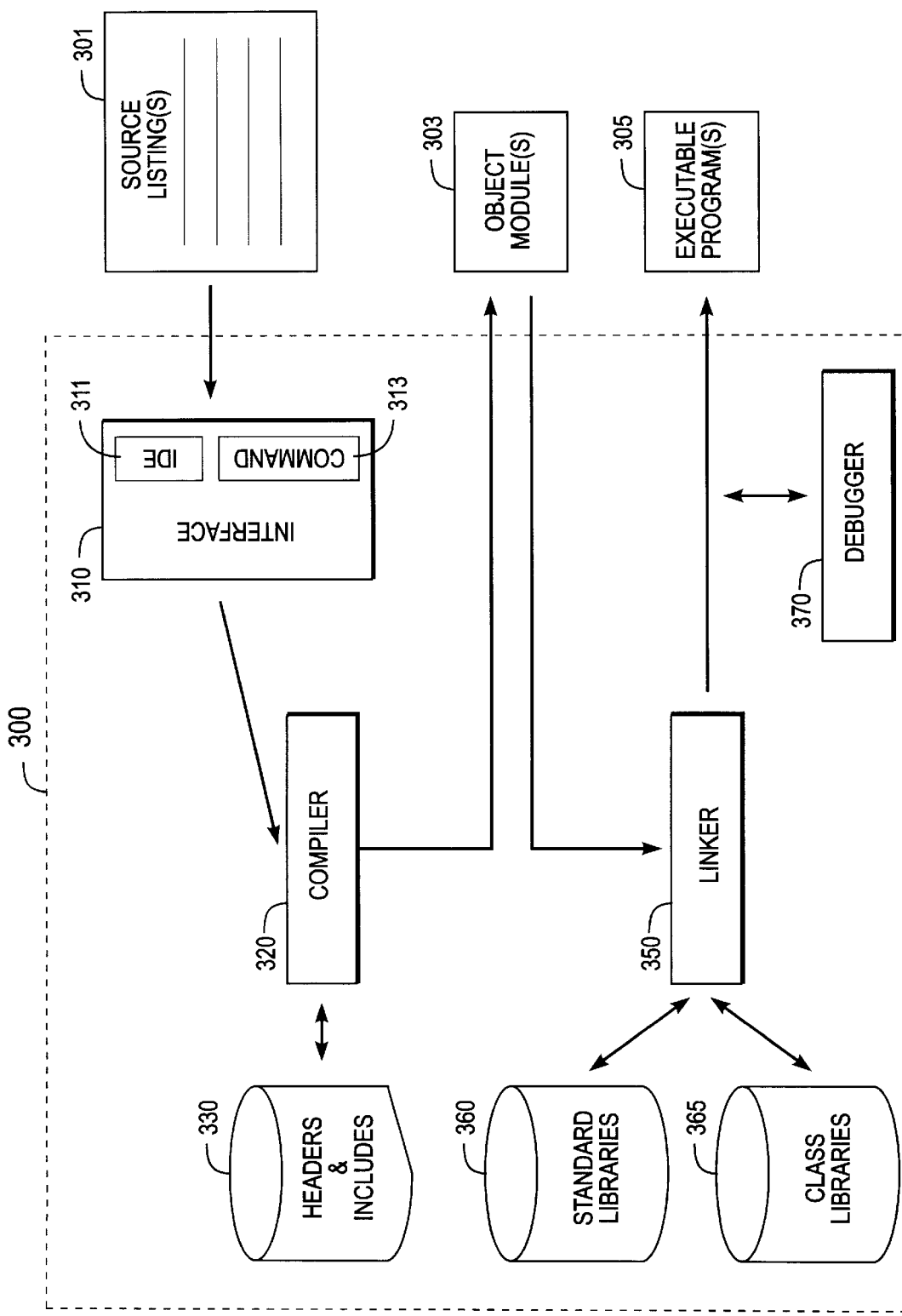
FIG. 3A is a block diagram of the development system of FIG. 1B.
Figure 3B:
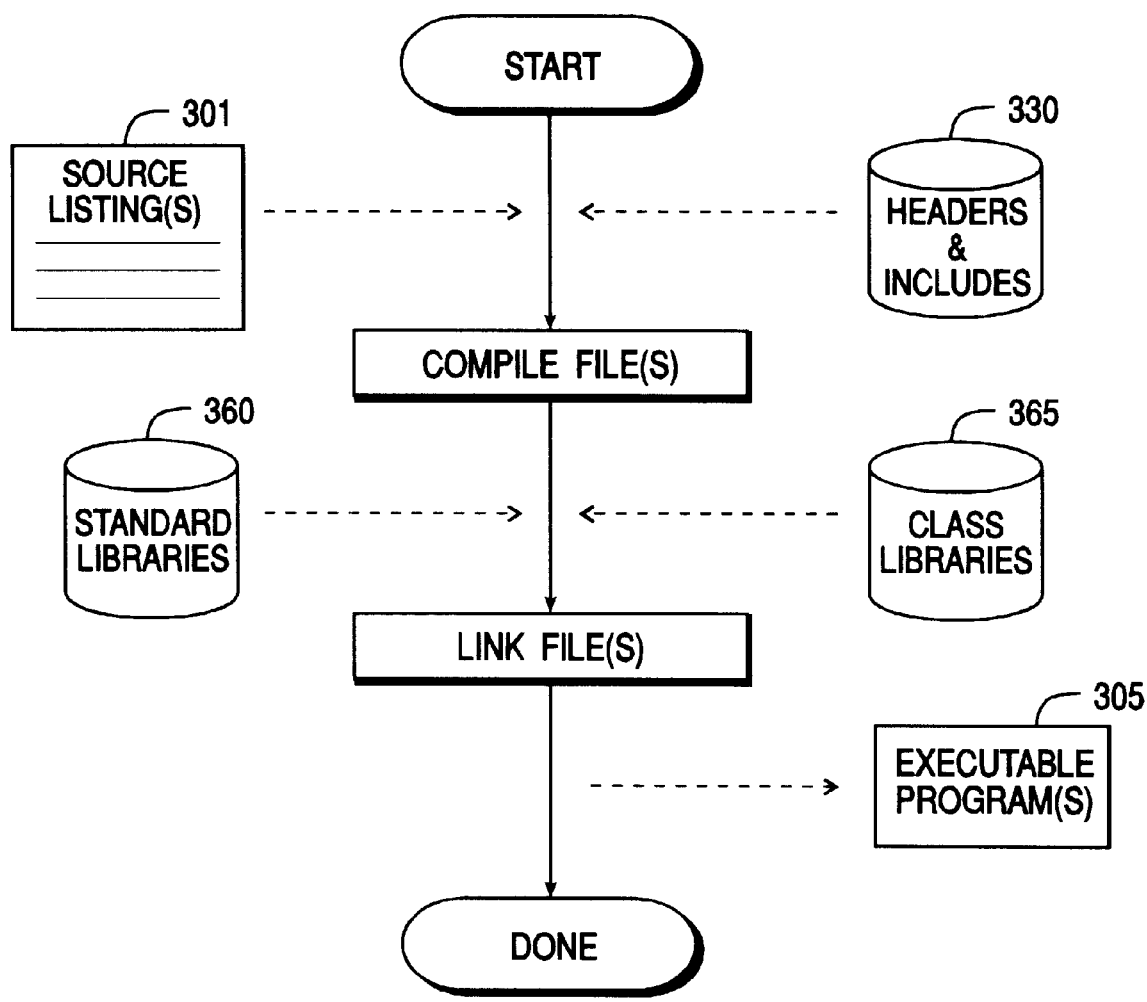
FIG. 3B is a flowchart illustrating the general operation of the development system of FIG. 3A.

Referring now to FIG. 3A, the development system 300 of the present invention will now be described in further detail. System 300 includes an compiler 320, a linker 350, and an interface 310; with additional reference to FIG. 3B, the general operation of the system is as follows. Through interface 310, the user or developer supplies source listings 301 to the compiler 320. Interface 310 includes both command-line driven 313 and Integrated Development Environment (IDE) 311 interfaces, the former accepting user instructions through command-line parameters, the latter providing menuing equivalents thereof. From the source code 301 and header/include files 330, the compiler 320 "compiles" or generates object modules or files 303.

Upon successful creation of object (.obj) files, linker 350 next "links" or combines the object files 303 with standard libraries 360 (e.g., graphics, I/O routines, startup code, and the like) to generate program(s) 305, which may be executed by a target processor (e.g., processor 101 of FIG. 1). In addition to standard libraries, development system 300 provides class libraries 365, C++ libraries which simplify windows development (as described in further detail hereinbelow). A debugging module 370 may be added, as desired, for eliminating errors in the program listings 301. In a preferred embodiment, system 300 includes Borland C++ & Application Frameworks™ 3.1, available from Borland International of Scotts Valley, Calif.

For further discussion of the general construction and operation of compilers; see e.g., Fischer et al., Crafting a Compiler with C, Benjamin/Cummings Publishing Company, Inc., 1991, the disclosure of which is hereby incorporated by reference.

Simplified Windows Development

Object-oriented Programming

A. Introduction

When one examines what makes Windows programming difficult, two things stand out: the event-driven model and the voluminous code required to make anything happen. Object-oriented programming (OOP) provides a simplified approach to both. With an object-oriented language, the programmer does not have to write a lot of tedious Windows message-dispatching code with special case arms for different types of messages. Instead, he or she creates reusable objects which know how to respond directly to individual messages.

Of particular interest to the present invention is an object-oriented environment supporting the C++ programming language, which includes features of data encapsulation, inheritance, and polymorphism. For a general introduction to C++, see e.g., Ellis, M. and Stroustrup, B., The Annotated C++ Reference Manual, Addison-Wesley, 1990. Additional information about object-oriented programming and C++ in particular can be found in Borland's C++ 3.1: 1) User's Guide, 2) Programmer's Guide, and 3) Library Reference, all available from Borland International of Scotts Valley, Calif. The disclosures of each of the foregoing are hereby incorporated by reference.

B. Object-oriented approach to messages

MS-Windows itself is not an object-oriented system, but it possesses characteristics which facilitate application development with OOP tools. Most notably, Windows is an event-driven or message-based system; its messages are analogous to the OOP concept of sending messages to objects. Combining the event-driven nature of Windows with an OOP language creates a single, more consistent development model. Just as a high-level language frees a programmer from the need to understand machine-level details, an OOP language, by hiding Windows details, eases the task of learning an event-driven architecture.

To write Windows applications in an OOP language, one preferably defines "response methods"—special class methods (member functions) that handle messages for the class. More particularly, a window object is instantiated with message-response member functions, that is, methods which know how to process messages for that window. Message response functions are usually not called directly but instead are invoked automatically in response to events of the user or system. This basic idea holds true whether one is trapping user input or responding to system messages, DDE messages, or other Windows messages.

In operation, a message is automatically routed to a virtual function that has been assigned an identifier corresponding to the message (using a special dynamic dispatching syntax). As seen in the following C++ class definition, for instance, response methods may be defined within a class (e.g., TMyWindow) as:

```
_CLASSDEF (TMyWindow)
class TMyWindow : public TWindow
{
public:
    TMywindow(PTWindowsObject AParent, LPSTR ATitle)
        : TWindow(AParent, ATitle) {};
    virtual BOOL CanClose();
    virtual void WMLButtonDown(RTMessage Msg)
        = [WM_FIRST + WM_LBUTTONDOWN];
    virtual void WMRButtonDown(RTMessage Msg)
        = [WM_FIRST + WM_RBUTTONDOWN];
};
/*
    The addition of the constant WM_FIRST to the command
    ID constant guarantees that the IDs do not conflict with
    standard Windows message constants.
*/
```

Here, two message-response functions are defined: WMLButtonDown() and WMRButtonDown(); the former responds to $WM_{13}$ LBUTTONDOWN messages, while the latter responds to $WM_{13}$ RBUTTONDOWN messages. At the compiler level, the message is dispatched to its corresponding response function through use of a dynamic dispatch virtual table (DDVT). Based on the message identifier appended to its definition, a corresponding virtual function is referenced and invoked. In other words, dynamic dispatching triggers an action (member function) in response to capturing a message of interest. The dynamic dispatching extension to C++, based on the C++ "pure virtual" syntax, eliminates the unreadable, C-style case statement approach, thus facilitating the handling Windows messages. Moreover, within a response function itself, one only has to write the function body as he or she would normally do in a non-event driven system.

Using message-response functions, while undoubtedly better than the standard, case-statement technique, is not a perfect solution. In particular, the technique requires use of an extension to the base language, C++, which is arguably compiler specific. Hence, code written using the technique consequently may have limited portability to other environments. Moreover, all the message-response functions require the same list of argument types, notably a message (msg) which must be further dissected into components of interest (e.g., lparam or wParam); preferably, a function would instead take parameters which are actually utilized within the function. As an alternative to DDVT-invoked functions, one could define a "message map" (implemented through a macro) within a class definition, for example:

```
class C : public TWindow
{
public:
    void move (int, int);
    BEGIN_MESSAGE_MAP    // macro begin
        ON_MOVE(move)    // on WM_MOVE msg call move()
    END_MESSAGE_MAP      // macro end
};
``` with the macro including facility for calling the move() function and splitting up the parameters passed to the function in a manner appropriate for the message (here, $WM_{13}$ MOVE). The macro operates by storing the address of the member function (here, &C::move) together with the message number associated with it.

While message maps are a rather straightforward implementation, they have distinct disadvantages. Declared within the class definition itself, the syntax of the macro is awkward at best and perhaps even illegal. Worse yet, the macro relies the rather outdated practice of casting—here, casting the address into a pointer-to-member function of the base class (where dispatching actually occurs). As is well known in the art, casting defeats the type checking which ordinarily would be provided by the compiler and is to be avoided. In the example at hand, casting would conceal errors in the argument list, creating difficult-to-track program bugs. Moreover, present day implementations of message mapping do not support multiple inheritance. A better solution is desired.

Improved Message Response Functions

C++ Templates

A. Introduction to Templates

According to the present invention, methods are provided for message dispatching using C++ templates. Before describing specific message dispatching methods of the present invention, however, it is helpful to first review templates—a recent extension to the proposed ANSI C++ syntax.

The concept of C++ templates is perhaps best introduced by reviewing the age-old problem of providing a "generic" function, that is, one which is not tied to any specific parameter type. Consider, for instance, the problem of providing a function max(x,y) that returns the larger of its two arguments, x and y, which can be of any data type (that can be ordered). In a strongly typed language such as C++ (and the a lesser extent ANSI C), the problem, of course, is that the function expects the types of the parameters to be declared beforehand, that is, at compile time.

The classic standard C approach to this problem has been to use a macro, for instance:

```
#define max(x,y) ((x) > (y)) ? (x) : (y))
```

This works, but it creates a new problem. Specifically, the approach circumvents the type-checking mechanism provided by ANSI C and C++. And in the latter, use of macros is almost obsolete. Clearly, the intent of max(x,y) is to compare compatible types; unfortunately, using the macro allows a comparison between data types (e.g., an unsigned int and an int) with unintended results. Consider max(1u, −1), for instance. At the bit level, a comparison between 0x01 and 0xFF is made. Since 0xFF>0x01, such a comparison would return the erronous result that −1 is the larger number.

As another problem, the substitution to be performed may not be what is desired. Consider the macro expansion in a C++ class definition, for instance:

```
class Foo
{
  public
    int max(int, int); // Results in syntax error; this gets expanded!!!
    //...
};
```

Here, int max (mint, int) is a method declaration of class Foo; its expansion here is unintended, leading to a hard-to-diagnose error.

Of course, one could create separate functions for each type, for instance declaring:

```
int max_int(int x, int y)
{
    return (x > y) ? x : y;
}
long max_long(long x, long y)
{
    return (x > y) ? x : y;
}
float max_float(float x, float y)
{
    return (x > y) ? x : y;
}
```

But this is highly awkward at best. The approach is prone to error as the programmer would have to undertake extra effort to match each data pair with one of three different function names (i.e., $max_{13}$ int( ), max_long( ), or $max_{13}$ float( )). The approach is unworkable for all but the simplest of programs.

With C++, programmers have another solution—overloading. Overloading is a technique which allows the system to correctly determine, based on parameter type passed at runtime, which version to invoke. For example, many overloaded versions of maxo could be provided, one for each data type to be supported. For example,

```
int max(int x, int y)
{
    return (x > y) ? x : y;
}
long max(long x, long y)
{
    return (x > y) ? x : y;
}
float max(float x, float y)
{
    return (x > y) ? x : y;
}
```

In each instance, regardless of parameter type, only a single function, maxo, is called. As the code for each version is essentially identical, however, the code is highly duplicative. A better solution is desired.

C++ templates, also called generic or parameterized types, provide the best solution to the problem. By using a template, one can define a pattern for a family of related overloaded functions by letting the data type itself be a parameter. Thus instead of the programmer explicitly coding several overloaded functions, the compiler creates the needed function based on the parameter types which are provided at runtime.

Consider, for example, the following function template definition:

```
template <class T>
T max(T x, T y)
{
    return (x > y) ? x : y;
};
``` where the data type is represented by the template argument, <class T>. When used in an application, the compiler generates a call to the appropriate function according to the data type actually passed:

```
int i;
Myclass a, b;
int j = max(i,0);      // arguments are integers
Myclass m = max(a,b);  // arguments are type Myclass
```

Any data type, not just a class, can be used for <class T>. The compiler calls the appropriate operator>(), so the programmer can use maxo with arguments of any type for which operator>() is defined.

Templates can be further divided into function templates and class templates. The foregoing example is generally called a function template; the argument type(s) of a template function use all of the template formal arguments. If not, there is no way of deducing the actual values for the unused template arguments when the function is called. A specific instantiation of a function template is called a template function.

A class template (also called a generic class or class generator), on the other hand, allows one to define a pattern for class definitions, such as generic container classes.

```
//    Vector is a class template.
//
template <class T> class Vector
{
    T *data;
public:
    Vector( int i );
    T& operator [ ] ( int );
};
```

From this class template, the following classes are created (upon instantiation with an object):

```
//    Vector<int> is a class, as are Vectar<long> and Vector<float>.
//
int main( )
{
    Vector<int> vi;
    Vector<long> vl;
    Vector<float> vf;
    return 0;
}
```

For further discussion of the operation of C++ templates, including class templates, the reader should refer to Chapter 14 (Templates) of The Annotated C++ Reference Manual, supra.

B. Template-driven Response Functions

1. Introduction

According to the present invention, message-response functions are provided which eliminate reliance on DDVTs. In particular, the message-response functions that are provided by the development system 300 do not dependent on compiler-specific extensions nor unsafe casting operations.

An exemplary class with response capability may be constructed from the following class definition:

```
class C : public TWindow
{
public:
    void move(int, int);
    static registry r;    // this object understands the dispatching
};
```

As shown, the class includes its own registry object, r, which understands the dispatching of messages. The function template which registers a member function, may be constructed as:

```
template <class T>
    void register( int msg, void (T::*func)(int, int) )
{
    T::r.add(msg, func);
};
```

Like the macro operation above, the template provides the address of a member function. Unlike the foregoing macro, however, no particular class need be specified. Instead, a desired function can be registered in the right class, without having to cast it into a pointer to the base class and without discarding argument type information. In essence, the compiler can determine which class is referenced and, hence, which registry object shall be invoked. Thus by preserving class information and argument type information through the use of templates, the compiler can generate the right function call without relying on unsafe casting operations.

Figure 4A:
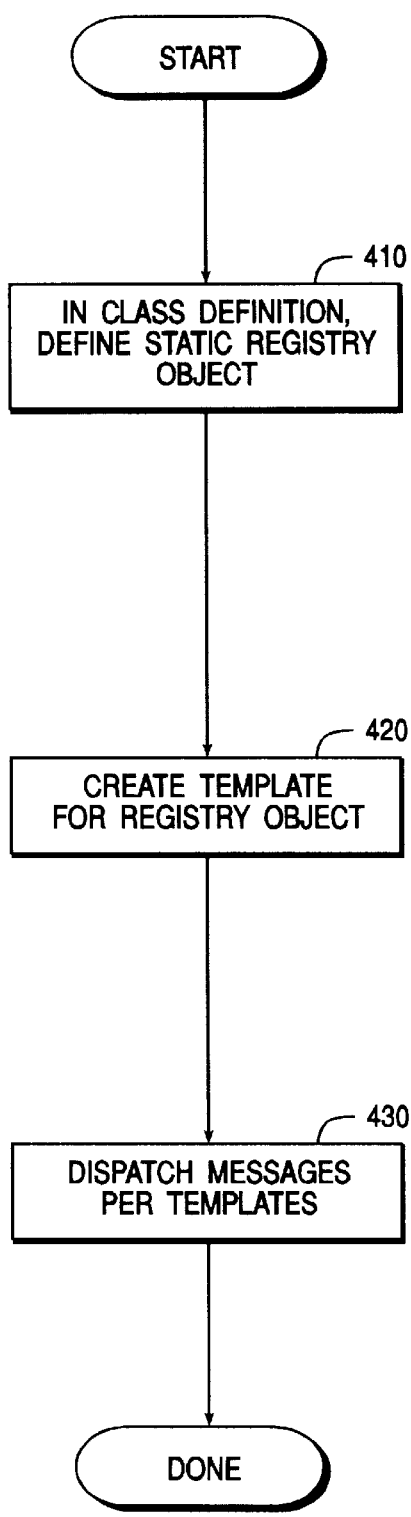
FIG. 4A is a flowchart illustrating the overall method of the present invention for message dispatching using C++ templates.

Referring now to FIG. 4A, a general overview of message dispatching in accordance with the present invention is illustrated. In step 410, the user defines his or her own C++ class; the class includes at least one method (function) for responding to a message, and including an object—the registry object—which knows how to respond to the message (by calling an appropriate response method). At step 420, a "register" function template is provided to simplify the registering of the message/method pair for the class of interest. As shown by its prototype, the register function takes two parameters: an identifier (msg) for the message and a pointer to the function which knows about that message (i.e., how the message or its parameters are to be interpreted). More particularly, the function calls an add method (i.e., generic container function) for registering message/response function pairs; as shown, the class information is retained with the message. At step 430, a particular message of interest (e.g., WM_MOVE) is dispatched in accordance with the template definition of step 420, whereupon the message invokes the proper response function.

2. Response Tables

Figure 4B:
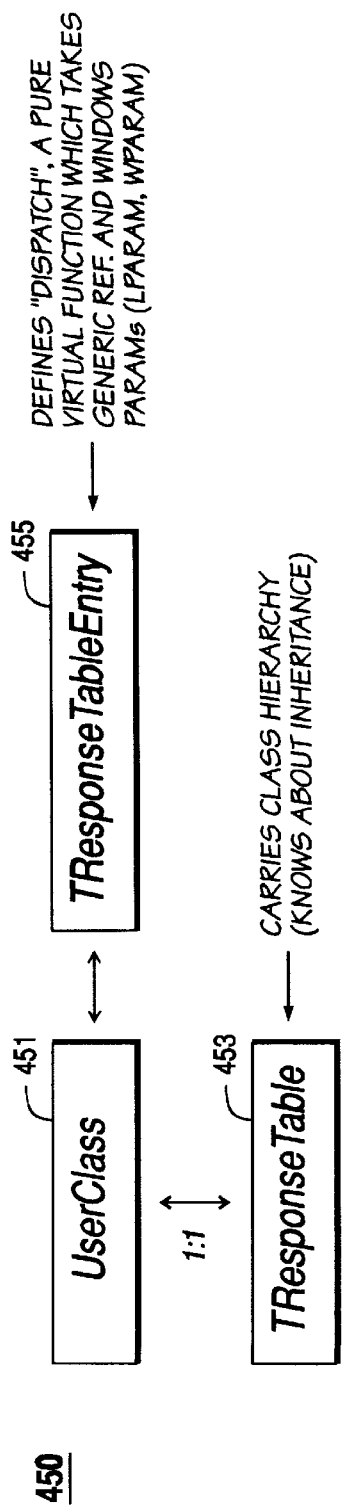
FIGS. 4B–C are block diagrams illustrating the relationship between a response table of the present invention and a user-defined class.
Figure 4C:
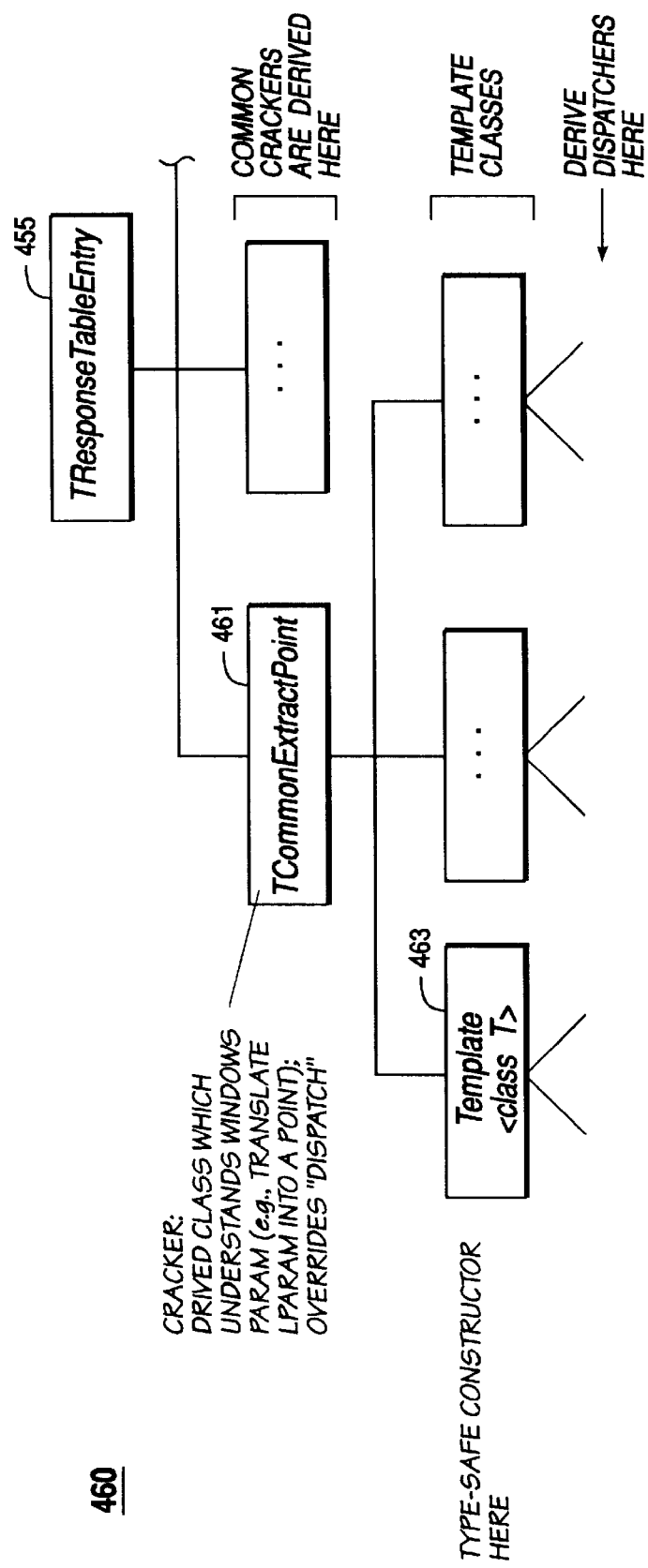

In a preferred embodiment, message dispatching is effected through "response tables" of the present invention. As shown in FIGS. 4B–C, a user-defined class 451 has associated with it a single response table, TResponseTable 453. Thus, a 1:1 relationship exists between a user class and its response table. The detailed construction and operation of TResponseTable will now be described.

a) Class TResponseTable

As shown by the block diagram 450 of FIG. 4B, TResponseTable, which is preferably implemented as a C++ template class, primarily functions to carry class hierarchy information about its user class. When instantiated, it stores a pointer to an array of response table entries; the entries themselves are stored in TResponseTableEntry 455 (described hereinbelow). It also stores a list of pointers to one or more base classes, thereby supporting multiple inheritance. As described below, single inheritance is treated as a special case. This approach minimizes overhead for users who do not want to use multiple inheritance, yet makes the dispatching of messages extensible.

In an exemplary embodiment, a TResponseTable class may be constructed from the following C++ class template:

```
template <class T> class TResponseTable : public TAnyResponseTable {
   public:
      const BOOL    isSI;    // is single-inheritance (tag for union)
      TResponseTableEntry<T> *entries;
      union {
         TAnyResponseTable        *base;
         BI_ICVectorImp<TMIBaseForT<T> > *bases;
      };
   // construct a single-inheritance response table by supplying the base
   // class (NULL terminated list of response table entries is retrieved
   // automatically)
   //
   TResponseTable (TAnyResponseTable *b) : isSI (TRUE),
                  entries (T::_entries) (base = b;)
   // construct a multiply-inherited response table (NULL terminated list
   // of response table entries is retrieved automatically)
   TResponseTable ( ) : isSI (FALSE),
      entries (T::_entries) {bases = new
      BI_ICVectorImp<TMIBaSeForT<T> >(2, 1);}
};
```

In this fashion, the TResponseTable 453 may be employed to dispatch messages to specific functions.

Specifically, TResponseTable 453 calls into TResponseTableEntry 455, which stores information referencing the response method. Since the response table 453 "knows" (stores a reference to) which class it is associated with (e.g., user class 451), it references the correct response table entries stored in TResponseTableEntry 455. In the event that a match is not found, the response table, storing the class hierarchy information for its user class, may locate a base class having the response method of interest.

b) Class TResponseTableEntry

According to the present invention, the dispatcher should be extensible, yet compile-time type checking should be provided. In an exemplary embodiment, a TResponseTableEntry class may be constructed as follows:

```
class TResponseTableEntry {
 public:
   UINT msg, id;
   virtual LRESULT Dispatch (GENERIC &, WPARAM, LPARAM) = 0;
   TResponseTableEntry (UINT m, UINT i) : msg (m), id (i) { }
};
```

This approach supports multiple inheritance and is extensible. In addition, type checking may be added in derived classes to ensure that the pointer to member function the user supplies has a correct signature. More importantly, the array of response table entries can be built statically by the compiler, thereby eliminating any overhead in code size and runtime initialization.

As shown, TResponseTableEntry 455 includes a Dispatcho method, which takes a generic reference (GENERIC &) and windows parameters (LPARAM and WPARAM) as its parameters. Since TResponseTableEntry class 455 is an abstract class (i.e., it includes at least one pure virtual function), at least one derived class must be created. Specifically, a class is derived which overrides the virtual dispatch function, adding specific knowledge for processing the message parameters associated with the message of interest (i.e., for "cracking out" or extracting the information required for its specific message type). For instance, a TCommonExtractPoint class 461 for extracting "Point" information from Windows may be created from the following C++ template:

```
template <class T> class TCommonExtractPoint : public
TResponseTableEntry {
   protected:
      // extract "POINT &" from lParam
      typedef void (T::*PMF) (POINT &);
      PMF pmf;
   public:
      LRESULT Dispatch (T &object, WPARAM, LPARAM lParam)
         {(object.*pmf) ((POINT &) lParam); return TRUE;}
      TExtractCommonPoint (UINT msg, UINT id; PMF p);
         // store pointer-to-member in "p"
};
```

For TCommonExtractPoint 461, the Windows message parameter lParam includes a point (screen point) of interest; thus, the cracker need only extract this point from the lParam data structure (e.g., by casting lParam to a Windows POINT type). In a preferred embodiment, the system provides default message crackers for standard Windows messages.

Next, a family of template classes are derived, one for each type of message cracking. The template classes do not know which specific classes they are invoked with, but they do provide the correct parameter type and parameter type safety. The desired type checking is provided by making the derived classes template classes and their constructors accept a pointer to method function with an appropriate signature. For instance, template class 463 may be created from TCommonExtractPoint as follows:

```
template <class T> class TExtractpoint : public TCommonExtractpoint {
   public:
      typedef void (T::*TPMF) (POINT &);
      TExtractPoint  (UINT msg,
                     UINT id,
                     TPMF pmf) : TCommonExtractPoint (msg, id,
                                                     (PMF &)
                                                     pmf) { }
};
```

From the template classes, various dispatchers (i.e., those which use this particular message cracking) are derived which are type safe as to class. A simple example demonstrates this use:

```
class A {
   public:
      void Func (POINT &);
      static TResponseTableEntry *_entries[ ];
};
TResponseTableEntry *A::_entries[ ] = {new TExtractPoint<A>
(0, 0, &A::Func));
```

Thus, any function for which the lParam is a point is registered as a TExtractPoint, which is derived from TCommonExtractPoint 461. As shown, the derived dispatchers include type-safe constructors. In this fashion, a family of classes may be derived from TCommonExtractPoint 461, yet differ in that each has its own type safe constructor.

As shown by the TExtractPoint class template, TPMF provides type safety. In particular, TPMF is a pointer to member of class T which takes a point reference (POINT &). The parameter of type TPMF is passed down to TCommonExtractPoint 461, but only after it has first been cast to PMF—a pointer to member function which is generic. Hence, the class information is no longer needed when this is passed to TCommonExtractPoint. In this manner, the constructor is initialized to point to a function which is passed in with the constructor.

The above approach benefits from extensibility and type safety. Extensibility is achieved using delegation, not inheritance (as before). The pointer to function that is used to do the cracking/dispatching—TAnyDispatcher—may be constructed as:

```
class GENERIC;
typedef void (GENERIC::*TAnyPMF) ( );
//
//   all message cracker functions take four parameters:
//   - reference to a "generic" object
//   - pointer to "generic" member function (signature varies
//       according to the cracking that the function performs)
//   - WPARAM
//   - LPARAM
//
typedef LRESULT (*TAnyDispatcher) (GENERIC &, TAnyPMF,
WPARAM, LPAMAM);
```

A family of functions to do message cracking/dispatching, one for each type of signature, is provided.

According to the present invention, type checking is also provided. Perhaps the most important type checking to provide is that which ensures that the pointer-to-member function that is used has a signature that is appropriate for the message cracking performed. This is the where the the greatest opportunity for error exists.

Since the cracking/dispatching is done using delegation, class TResponseTableEntry does not know in advance what signatures to expect and declares the pointer to member function as returning no argument and having no formal parameters. Macros are provided for building a response table entry which will perform a cast of the user supplied pointer to member function to the type expected by class TResponseTableEntry (i.e,. void return and no formal parameters).

Preferably, the macros check that the signature matches that expected by the dispatcher function. This can be accomplished using template functions: for every dispatching/cracking function there will be a corresponding template function that accepts a pointer-to-member function of the correct signature and simply returns it.

Using the example of a dispatcher that "cracks" wParam and lParam to produce a POINT which it passes to the pointer-to-member function, a template function $v_{13}$ POINT$_{13}$ Sig()may be constructed from:

```
template <class T>
inline void (T::*v_POINT_Sig (void (T::*pmf) (POINT &))) (POINT &)
{
    return pmf;
}
```

$v_{13}$ POINT$_{13}$ Sig()is a template function that has two formal parameters: a pointer-to-member function of class T (where T is the template argument) and a reference to a POINT; the function includes a void return. Preferably declared in-line, the function simply returns its actual parameter. A definition of an array of response table entries for a class "B", for example, may be constructed from:

```
class B {
    public:
        void MouseMove (POINT &);
};
TResponseTableEntry<B> entries[ ] =
    {{WM_MOUSEMOVE, 0, (TAnyDispatcher) v_POINT_Dispatch,
      (PMF) v_POINT_Sig (&B::MouseMove)}};
```

This approach correctly ensures that the pointer-to-member function has the correct signature. At this point, assuring type safety is a simple matter of using the macros that are used to create a response table entry aggregate.

c) Class TEventHandler

According to the present invention, multiple inheritance is provided by introducing class TEventHandler into the class hierarchy:

```
// class from which to derive classes that can handle events
//
class TEventHandler {
};
Class TWindowsObject will be changed to derive from TEventHandler,
    class TwindowsObject : virtual public TEventHandler
Class TEventHandler will have one method:
    - Dispatch( )
Function Dispatch is declared as follows:
    LRESULT
    Dispatch    (GENERIC                       &object,
                 TResponseTableEntry<GENERIC>  &entry,
                 WPARAM                        wParam,
                 LPARAM                        lParam);
```

Given a response table entry and a reference to an object of class GENERIC, Dispatcho invokes the dispatcher/cracker pointer-to-function passing parameters wParam and lParam as arguments, as follows:

```
return (*entry.cracker) (object, (TAnyPMF &) entry.pmf, wParam,
lParam);
``` d) TEventHandler and Class GENERIC

TEventHandler is defined to be the base class for all classes that want to handle events. The real purpose of TEventHandler is to serve as a base class for multiply inherited branches of the hierarchy. Accordingly, class TResponseTableEntry accepts a pointer-to-member function of classTEventHandler; the cracker/dispatcher functions, in turn, operate on TEventHandler(s), for instance:

```
class TResponseTableEntry {
    public:
        typedef void    (TEvent.Handler::*PMF) ( );
        UINT            msg;
        UINT            id;
        TAnyCracker     cracker;  // pointer to func to do message cracking
        PMF             pmf;      // and dispatch
};
```

Since one cannot convert a pointer-to-member function to be of type pointer-to-member function of a virtual base class (because the inverse operation from virtual base class back to derived class is not valid), the approach does not work. Consider the following example:

```
class A : virtual public TEventHandler { };
class E : virtual public TEventHandler { };
class C : public A, public B {
  public:
    void Func ( );
};
void (A::*pmt) ( ) = (void (A::*) ( )) &C::Func; // invalid!!!
```

Declaring TEventHandler to not be virtual does not help either. In that instance, class C would have two copies of class TEventHandler; as a result, class TEventHandler would be ambiguous (as to which one to use when a message is received).

To overcome this problem, the present invention includes a class GENERIC. All pointer-to-objects and pointer-to-member functions are cast to be of type class GENERIC. This is a safe cast, which generates no code, converts the pointers to untyped pointers. This is safe because the type of function is also stored. The saved type information allows the call to be done correctly.

As an alternative, TResponseTableEntry could be constructed as a template class that expects a pointer-to-member function of class "T", with the cracker/dispatcher specifications changed as follows:

```
// extracts a POINT & from lParam and pass it to "pmf"
//
void ExtractPointCracker  (TEventHandler *object,
                           void (TEventHandler::*pmf) (POINT &),
                           WPARAM,
```

-continued

```
                           LPARAM);
```

In this instance, the cracker/dispatcher functions are, from their perspective, being called with pointers to an object of class TEventHandler and a pointer-to-member function of class TEventHandler. Since, in reality, this is not the case, it is safer to treat it as a pointer to an unknown class; that way the compiler does not make any false assumptions (particularly, in trying to optimize the pointer-to-member function call).

e) Macro Simplification

In a preferred embodiment, the end user/programmer is shielded from unnecessary implementation details by the use of macros. Two macros, in particular, are provided for declaring a response table: $DECLARE_{13}$ $RESPONSE_{13}$ TABLE and $DECLARE_{13}$ $NV_{13}$ $RESPONSE_{13}$ TABLE. The former is used declaring a response table for a class derived from TWindowsObject, the latter for a class which is not derived from TWindowsObject. The two macros may be defined as follows:

```
#define DECLARE_NV_RESPONSE_TABLE(cls)\
  public:\
    static TResponseTableEntry<cls>          _entries[];\
    typedef TResponseTableEntry<cls>::PMP    TMyPMF;\
    static TResponseTable<cls>               responseTable
#define DECLARE_RESPONSE_TABLE(cls)\
    DECLARE_NV_RESPONSE_TABLE (cls);\
    virtual TResponseTable<TWindowsObject> &GetResponseTable ()\
      {return (TResponseTable<TWindowsObject> &) responseTable;}\
    virtual GENERIC *ToDerived () {return (GENERIC *) this;}
```

Macro $DECLARE_{13}$ $RESPONSE_{13}$ TABLE, after invoking the macro $DECLARE_{13}$ $NV\_RESPONSE_{13}$ TABLE for defining an array of response entries and a response table, defines two the virtual functions: GetResponseTable() and ToDerived().

3. Response Table Entries

In a preferred embodiment, one macro is defined per Windows message. For a generic message that is passed a wParam and lParam without doing any message cracking, the macro may be defined as follows:

```
#define EV_MESSAGE(method, message)\
    {message, 0, (TAnyCracker) &::NoCrackingDispatcher, (TMyPMF) &method}
```

As shown, the macro hides the cast of the pointer-to-member function and specifies the cracker/dispatcher function that is to be used.

In an exemplary embodiment, all macros begin with $EV_{13}$ (for event) and use a predetermined method name signifying their actions. For a Windows $WM_{13}$ PAINT message, for instance, the following macro could be declared:

```
#define EV_WM_PAINT\
    {WM_PAINT, 0, (TAnyCracker) &::VoidVoidDispatcher, (TMyPMF) &EvPaint}
``` where VoidVoidDispatcher passes no arguments and expects no return value.

An exemplary definition of the response table and array of response table entries without a macro for class "TMyWin" (derived from base class "TWin") with two message entries may be constructed as:

```
TResponseTable<TMyWin> TMyWin::responseTable (&TWin::responseTable);\
TResponseTableEntry<TMyWin> TMyWin::_entries[] = {EV PAINT,
```

```
        EV_LMOUSEDOWN,
        EV_MESSAGE (0, 0, 0);}
```

The last entry is a NULL terminator. Thus, for:

```
#define DEFINE_RESPONSE_TABLE(cls,base)\
   TResponseTable<cls> cls::responseTable(&base::responseTable);\
   TResponseTableEntry<cls> cls::_entries[] = \
   {
#define END_RESPONSE_TABLE\
   {0, 0, 0, 0}}
``` using the macros, the definition is simplified as:

```
        DEFINE_RESPONSE_TABLE (TMyWin, TWin)
           EV_PAINT,
           EV_LMOUSEDOWN,
        END_RESPONSE_TABLE;
```

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the following claims.

Appendix

Multiple Inheritance

With multiple inheritance, the system should ensure that it has the correct "this" pointer when invoking a pointer-to-member function. This is accomplished by using virtual function ToDerivedo defined by macro $DECLARE_{13}$ $RESPONSE_{13}$ TABLE and virtual functions ToBase() defined by wrapper class TMIBase. The virtual functions convert a TWindowsObject pointer to the most derived class pointer using virtual function ToDerivedo. Thus at this point, the correct pointer needed is available.

The need for this approach is illustrated by the following scenario:

```
   class TMyWindow : public TMixIn, public TWindowsObject {
   };
```

Since the user has specified class TMixIn before specifying class TWindowsobject (assuming the compiler layout of objects is in the order of TMixIn, TWindowsObject, and TMyWindow), a (TMyWindow *) is not the same as a (TWindowsObject *) pointer. Therefore, the virtual function ToDerived() is preferably used to obtain a pointer to the most derived object.

Upon obtaining the correct pointer to start with, the response table is searched for a match. If one is not found, then the base class response tables is search. When the class has more than one base class, the "this" pointer is converted as appropriate to point to the correct sub-object for each base class that is searched; the ToBase() virtual function is employed for that purpose. The process continues up the class hierarchy in breadth-first order.

Exemplary Multiple Inheritance Macros

Multiple inheritance entails two additional macros. If one's class has no base class, one employs the macro $END_{13}$ $RESPONSE_{13}$ TABLE to signify the end:

```
#define DEFINE BASE RESPONSE_TABLE(cls)\
   TResponseTable<cls>     cls::responseTable(0);\
   TResponseTableEntry<cls>  cls::entries[ ]=\
   {
```

For a class with multiple base classes, one uses the following macro to invoke a parameterless TResponseTable constructor (using the macro $END_{13}$ $RESPONSE_{13}$ TABLE to signify the end as like before):

```
#define DEFINE_MI_RESPONSE_TABLE(cls)\
   TResponseTable<cls>     cls::responseTable;\
   TResponseTableEntry<cls>  cls::_entries[ ] =\
   {
```

Thus, a multiple inheritance example for class TMyWin, which has two base classes TMyWin and TMixIn, may be constructed from:

```
        DEFINE_MI_RESPONSE_TABLE (TMyWin)
           EV_MESSAGE (Func, 15),
        END_RESPONSE_TABLE;
        ADD_BASE_TO (TMyWin, TMixIn);
        ADD_BASE_TO (TMyWin, TWin);
```

Macro $ADD_{13}$ $BASE_{13}$ TO is provided for building a data structure for multiple inheritance and adding it to the collection of bases:

```
#define ADD_BASE_TO(derived, base)\
   static TMIBase<derived,base>_##derived##_BASE_##base
```

Finally, class TMiBase and its base class TMiBaseForT may be built as follows:

```
template <class T> class TMIBaseForT {
public:
   BOOL operator == (const TMIBaseForT<T> &) const (return TRUE;}
};
//
// here's the class is used to construct a wrapper
// for a derived class "T" that has a base class "B"
//
// declaring an instance of this class will add the base
// to the list of base classes in "T's" response table
//
template <class T, class B> class TMIBase : public TMIBaseForT<T> {
public:
   TAnyResponseTable *base;
   //
   // type-safe conversion from pointer to class "T" to pointer
   // to base class "B"
   //
   virtual B *ToBase (T *object) {return object;}
   TMIBase ( ) : base (&B::responseTable)
              {T::responseTable.bases->add (this);}
};
```

Class TMIBaseForT exists for the purpose of type checking, ensuring that the base class wrappers are of the same type as the response table.

What is claimed is:

1. In a system for creating programs from object-oriented source listings in a computer, the source listings including at least one class having data and methods, and the program operating in response to messages dispatched from the system, a process comprising:

(a) providing a C++ function template for associating a message with a selected method of the class, said template including instructions for storing message, method, and class information together as an entry in a response table; and (b) declaring a class to have user-defined data and methods, the class including a registry object for dispatching messages to methods of the class, the registry object including said instructions from the function template, whereby message, method, and class information are stored together as an entry in the response table for each method of the class which is responsive to a message.

2. The process of claim 1, wherein said method receives at least one message parameter storing status information about the system when a message is dispatched, and wherein said status information includes parameter type-checking information.

3. The process of claim 1, wherein said function template conforms to an ANSI standard C++ template.

4. The process of claim 1, wherein the template has the general form of:

```
template <class T>
    void register( int msg, void (T::*func)(int, int) )
{
    T::r.add(msg, func);
};
``` where msg represents an identifier of the message, *func represents an address of the method (function), T represents an identifier of the class, and (int, int) represents parameters passed to the method (function).

5. The process of claim 1, wherein said instructions include a register function receiving an identifier for the message and an address for the method.

6. The process of claim 1, wherein said message information includes an identifier for a single message, and wherein said method information includes a pointer (address) of the method.

7. In a system for creating programs executable in a computer, the computer including a message-driven operating system whereby events are communicated to the operating system and the programs by dispatching messages, a process for generating a computer program which processes a plurality of said messages, the process comprising:

(a) providing source listings comprising data and methods operative on the data, said source listings specifying a method to be invoked in response to a selected message, said method to be invoked receiving a parameter related to the message;

(b) storing within an executable program information representing said data and methods; and (c) storing within the executable program information indicating the method to be invoked in response to said selected message, said information including type-safe parameter information of the method, whereby said selected message is dispatched only to the method during execution of the computer program.

8. The process of claim 7, wherein said data and methods comprise at least one class of objects.

9. The process of claim 8, wherein said at least one class of objects includes a C++ class, wherein said data include data members of the C++ class, and wherein said methods include member functions of the C++ class.

10. The process of claim 9, wherein the C++ class includes a registry object for registering said selected message with the method.

11. The process of claim 10, wherein said information indicating the method to be invoked in response to said selected message includes an identifier for the message and a pointer (address) to the method.

12. The process of claim 8, wherein said information representing said data and methods includes instructions executable by a microprocessor.

13. The process of claim 7, wherein the message-driven operating system includes a graphical user interface (GUI).

14. The process of claim 13, wherein the graphical user interface includes a Microsoft® Windows-compatible interface and wherein said messages include Windows messages.

15. In a system for generating code executable in a computer from object-oriented source listings, the computer including a memory for storing data and a processor for performing methods operative on the data members, each method belonging to at least one class of methods, an improved process for message handling comprising:

(a) creating a table for dispatching messages to selected ones of the methods; and (b) for each said method which is to be performed in response to a message, storing an entry in the table information identifying the message, its method, and the class for the method.

16. The process of claim 15 further comprising:

dispatching the message to its method by reading the entry in the table.

17. The process of claim 15, wherein said method receives parameters identifying a state of the system upon occurrence of the message, the process further comprising:

storing type-checking information for the parameters in the table entry, whereby parameters passed to the method are checked for type safety.

18. In a development system for creating message-driven programs from source listings, the source listings including at least one class having data members and function members, an improved process for handling messages, the improvement comprising;

(a) selecting a message to be acted upon;

(b) providing a function member of a class to be invoked upon occurrence of the message, the function member to receive at least one parameter for indicating a system state; and (c) storing in the program an entry for processing the message, the information including an identifier for the message, a reference to said function member, information identifying the class of the function, and information specifying a type for each said at least one parameter.

19. The process of claim 18, further comprising:

(d) dispatching said message in response to a system event;

(e) locating an entry in the program for the dispatched message by matching the message with an identifier stored in the program;

(f) identifying the function member and its class from the located entry; and (g) executing the identified function member of the identified class with said at least one parameter, said at least one parameter having the specified type.

20. In a computer system having an event-driven architecture, the system operating under control of a program having at least one class of objects, each class specifying data and functions (methods) operative on data, and where events within the system are identified by dispatching messages, a process for making a function responsive to a message, the process comprising:
   (a) declaring the function to be a response function for the message by:
      (i) storing an identifier for the message as an entry in a response table,
      (ii) storing an address of the function in the entry, and
      (iii) storing information identifying the class of the function;
   (b) upon dispatch of the message, invoking the function of the class by referencing the entry in the response table.

21. The process of claim 20, wherein the function receives at least one parameter upon invocation, and wherein step (a) further includes:
   (iv) storing parameter type-checking information for the function in the entry, whereby parameters passed to the function are checked for type safety.

22. The process of claim 20, wherein step (a) includes:
   providing a function template for registering a selected message to the function of the class, the template having the general form of:

```
template <class T>
    void register( int msg, void (T::*func)(int, int) )
{
    T::r.add(msg, func);
};
``` where msg represents an identifier of the message, *func represents an address of the function, T represents an identifier of the class, and (int, int) represents parameters passed to the function.

23. A computer comprising:
   user input, a display and memory coupled to a central processor, said memory storing at least one program, said computer dispatching event messages from windows displayed on said display to said program, said program comprising a function template for providing said messages to a selected method of a class, said template comprising instructions for storing message, method, and class information together as an entry in a response table; said computer declaring a class to comprise user defined data and methods, said class comprising a registry object for dispatching messages to methods of said class, said registry object including said instructions from said function template, whereby message, method, and class information are stored together as an entry in said response table for each method of a class that is responsive to a message.

* * * * *